April 7, 1959  R. M. NARDONE  2,880,578
STARTING SYSTEM FOR ENGINES FOR JET AEROPLANES
Filed April 27, 1956  2 Sheets-Sheet 1

INVENTOR.
ROMEO M. NARDONE
BY
ATTORNEY

April 7, 1959   R. M. NARDONE   2,880,578
STARTING SYSTEM FOR ENGINES FOR JET AEROPLANES
Filed April 27, 1956   2 Sheets-Sheet 2

INVENTOR.
ROMEO M. NARDONE
BY
ATTORNEYS

United States Patent Office 2,880,578
Patented Apr. 7, 1959

2,880,578

STARTING SYSTEM FOR ENGINES FOR JET AEROPLANES

Romeo M. Nardone, Teaneck, N.J., assignor to the United States of America as represented by the Secretary of the Air Force Application April 27, 1956, Serial No. 581,260

4 Claims. (Cl. 60—39.14)

The present invention relates generally to engine starting mechanisms and, as illustrated herein, relates more particularly to starting high speed, high power engines, such as gas turbines, for jet propulsion of aircraft and similar applications wherein a large reservoir of energy is to be converted into turning effort to overcome the static inertia of such turbines as well as to produce the necessary acceleration of such a turbine to a speed at which continuity of power output is assured.

One object of the present invention is to provide improved means for connecting a starter engine to a high speed, high power engine which is effective to provide a speed reduction connection between said starter and said engine during the starting operation and which is effective to provide a direct driving connection between said engine and said starter after said engine has attained a speed at which continuity of power output is assured. To this end, and as illustrated, the starter turbine is connected to the gas turbine by planetary gearing which acts as a speed reduction coupling during the starting operation and which is thereafter arranged to lock the planetary gearing to provide a direct coupling between the starter turbine and the gas turbine as the gas turbine approaches normal operating speed.

Another object of the invention is to provide novel means for preventing the starter turbine from overspeeding prior to starting the gas turbine. In accordance with this object, another feature of the invention resides in novel means arranged to become effective at a predetermined speed to allow gases from the nozzle to be deflected from the starter turbine wheel and exhausted into the atmosphere thus reducing the speed of the starter turbine. To this end, and as illustrated, said means comprises spring loaded plungers which tend to rotate an overspeed control ring in one direction and pressure actuated plungers which tend to rotate the overspeed control ring in the opposite direction. During the starting operation, the force of said spring loaded plungers, plus the force of the exhaust gases from the reaction buckets, is slightly greater than the force of the pressure actuated pistons. When the starting turbine wheel reaches a fixed maximum speed, the force of the exhaust gases on the reaction bucket decreases permitting the pressure actuated pistons to overcome the force of the spring loaded plungers thus causing the overspeed ring to be moved in the opposite direction to permit propellant gases deflected from the turbine wheel to be exhausted directly to the atmosphere. At the completion of the firing or starting operation, the spring loaded plungers return the overspeed ring to normal operating position.

With the above and other objects and features in view, the invention will now be described with particular reference to the accompanying drawings which illustrate a preferred embodiment of the invention and in which.

Figure 1:
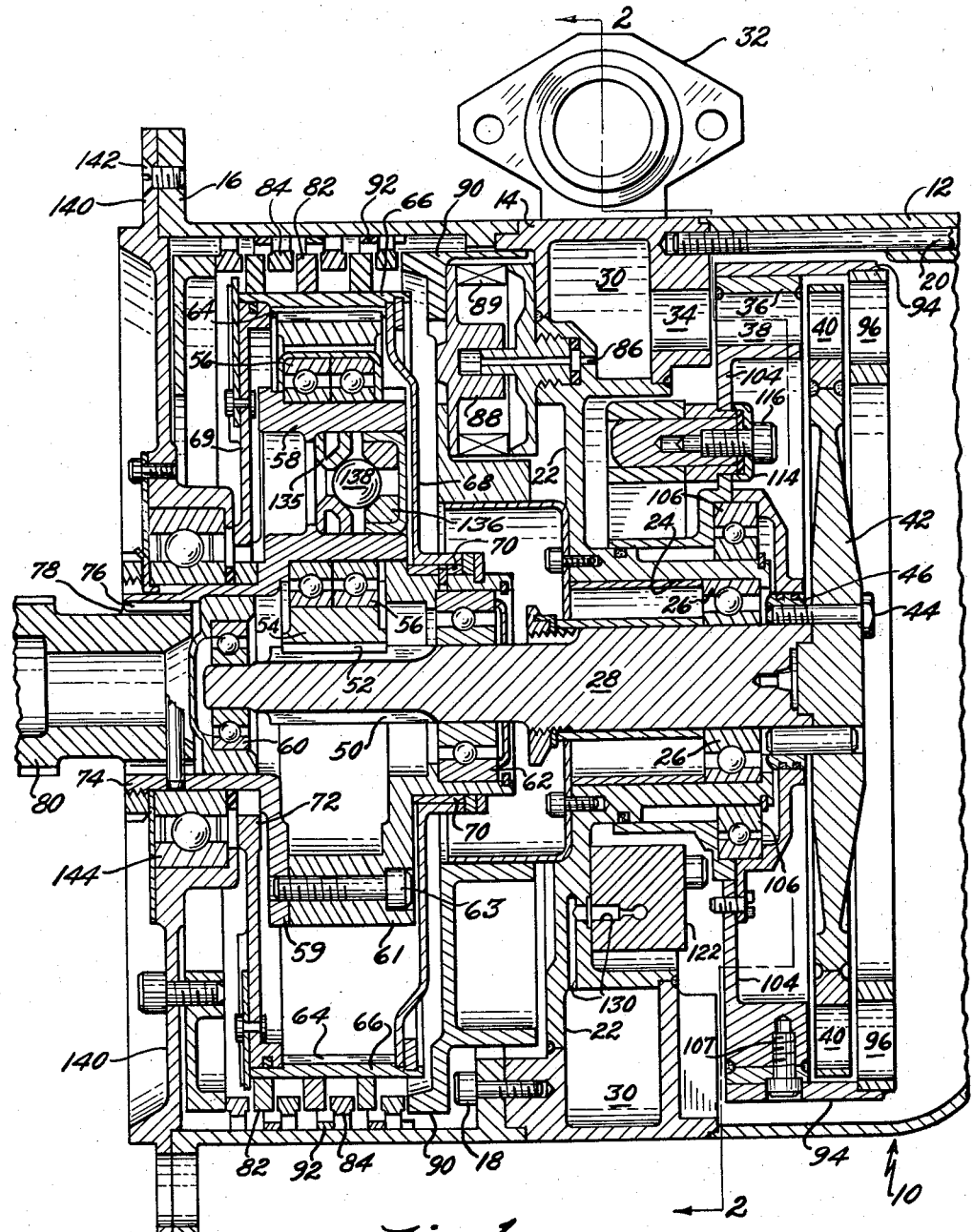
Fig. 1 is a vertical sectional view of a preferred embodiment of a starting system embodying the present invention.

The present invention relates to a starter system for gas engines arranged particularly for use in the jet propulsion of aircraft. The speed reducing coupling between the starter wheel and the output shaft of the starter turbine is preferably achieved by the provision of a speed reduction coupling such as a planetary gear train which is so constructed and arranged that the starter turbine is brought substantially to full operating or starting speed before the speed reduction coupling is rendered effective to rotate the output shaft and the main gas turbine connected thereto. It is desirable that the speed reduction coupling be locked to provide a direct drive between the main gas turbine and the starter turbine after the main gas turbine has attained a speed sufficient to assure continuity of power output.

As illustrated, the starter system is enclosed in a housing 10 comprising an exhaust housing section 12, an intermediate housing section 14 and a speed reduction coupling housing section 16 which are secured together in end-to-end relation by suitable fastenings such as machine screws 18 and 20. The intermediate section 14 is provided with an end wall 22 which is extended axially and provided with a central bore 24 having an antifriction bearing 26 therein for receiving a shaft 28. The housing section 14 is also provided with an annular passage 30 communicating with an intake manifold 32 which is connected to a reservoir or pressure-tight chamber (not shown) in which a suitable propellant such as a powder cartridge or other means for providing a propellant gas under high pressure and at high velocity. The propellant passes from the intake manifold 32 through the annular passage 30 and through nozzles 34 and through a feeder ring 36 having openings 38 therein. After the propellant passes through the openings 38 in the feeder ring 36, it impinges on peripheral buckets 40 on a starter turbine wheel 42 which is secured to the shaft 28 by machine screws 44 threaded into a radial flange 46 formed on the forward end portion of the shaft 28.

The shaft 28 is provided at its end portion remote from the flange 46 with splines 50 which are in the form of gear teeth which are constantly in mesh with gear teeth 52 formed on a planetary spur gear 54 mounted in suitable antifriction bearings 56 supported in a rotatable web or spider 58. The web 58 comprises two parts 59, 61, secured together by suitable machine screws 63 and in turn is rotatably mounted in antifriction bearings 60, 62, suitably supported on the shaft 28. The web 58 supports three planetary gears 54 as is usual construction. The planetary spur gears 54 are in mesh with internal teeth 64 of a ring gear 66 which is fixed to rotatable plates 68, 69 mounted in suitable bearings 70, 72. The planetary web 58 is provided with an axially extended portion 74 provided with internal splines 76 meshing with splines 78 formed on the outer surface of an output shaft 80. The shaft 80 is normally connected to a main gas turbine (not shown). With the planetary construction thus far described and with the output shaft 80 connected to the jet turbine, rotation of the jet starting turbine wheel 42 will cause rotation of the planetary spur gear 54 on its bearings 56, as is usual in planetary gearing, but since the output shaft 80 is under heavy load the planetary web 58 will remain stationary. The ring gear 66, however, at this point rotates freely and thus permits relative movement of the shafts 28 and 80.

The coupling between the turbine wheel 42 and the output shaft 80 of the starter is achieved by the use of a pressure-type clutch which comprises a plurality of rings 82, 84, alternate pairs of which are splined to the ring gear 66 and to the reduction gear housing section 16, respectively.

The pressure required for locking the clutch is obtained by pressure built up by gases which pass through feeder holes 86 to pistons 88 to cause the pistons 88 to move forward and apply pressure to the clutch rings 82, 84 through a pressure plate or disc 90. Escape of pressure fluid is prevented by a packing ring 89. With the clutch in locked position, as above described, the starter turbine wheel shaft 28 drives through the planetary gear train 54 giving the desired gear reduction. At the completion of the starting operation or upon cessation of propellant gas pressure, the pressure plate 90 is returned to its initial position by means of locating springs 92, thus permitting the internally toothed ring gear 66 to revolve freely.

However, as the speed of the starter turbine wheel 42 increases, the gas pressure within the turbine decreases as the turbine approaches maximum operating speed. Overspeed of the turbine wheel 42 is prevented by diversion of the gases to the atmosphere by a reaction bucket ring 94 and spring plungers 98 reacting against pressure pistons 102. The force of the exhaust gases from the turbine wheel 42 passing through the reaction buckets 96 in the bucket ring 94 plus the force of the spring-loaded plungers 98 is slightly higher than the force exerted by the pressure pistons 102. When the turbine wheel 42 reaches a fixed maximum speed, the force on the reaction bucket ring 94 decreases permitting the pressure piston 102 to turn the overspeed ring 94 to a position allowing gases from the nozzle 38 to be deflected from the turbine wheel 42 and exhausted directly into the atmosphere. At the completion of the starting operation, the spring mounted plungers 98 will return the overspeed ring 94 to normal operating position.

Figure 2:
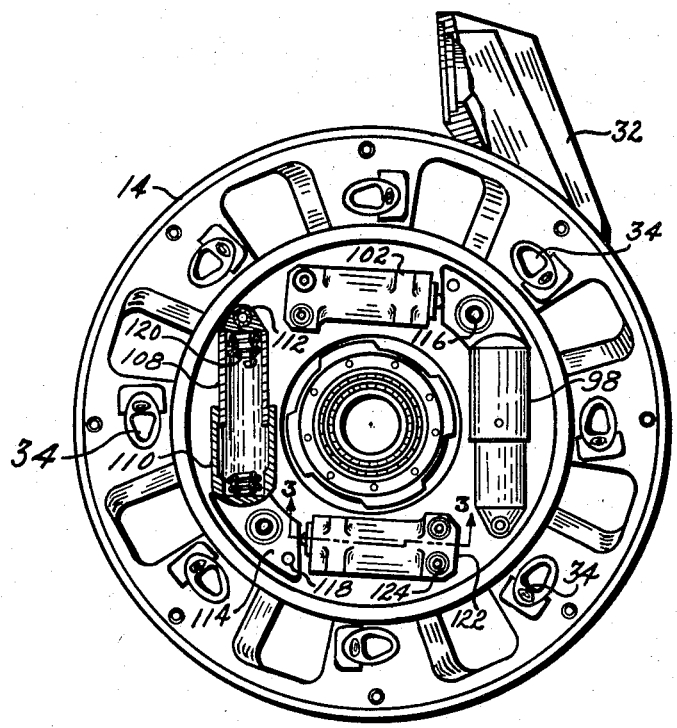
Fig. 2 is a view, partly in section, taken along the line 2—2 of Fig. 1.

The reaction bucket ring 94 is mounted on a member 104 which is rotatably mounted in bearings 106 supported on the axially extending annular portion of the end wall 22 which surrounds the bore 24 of the intermediate housing section 14. The reaction ring 94, together with the member 104 to which it is secured by suitable screws 107, is free to oscillate on the annular portion by spring plunger 98 and pressure pistons 102 above referred to. As shown most clearly in Fig. 2, a pair of spring plunger members 98 and a pair of pressure piston devices 102 are fixed to the wall 22 of the intermediate housing section 14. The spring members 98 each comprise inner and outer telescoping tubular members 108, 110, respectively, the inner member 108 being pivotally connected to the end wall 22 of the intermediate housing section 14 by a suitable machine screw 112. The outer end of the tubular member 110 bears against the end portion of a block 114 fixed to the member 104 by suitable machine screws 116 and pins 118. The telescoping members 108, 110 are normally urged apart by a pair of suitable compression springs 120 mounted within the members. As has previously been described, the pressure of springs 120 against the block 114 is so calculated that the force of the exhaust gases from the starter turbine wheel 42 passing through the reaction buckets 96 plus the force of the spring plungers 98 against the block 114 is slightly higher than the force exerted against said block 114 by the pressure plungers 102. These reaction buckets 96, as stated above, are maintained in normal position during the starting operation and are moved out of said position to slow down the turbine wheel 42 under overspeed conditions.

Figure 3:
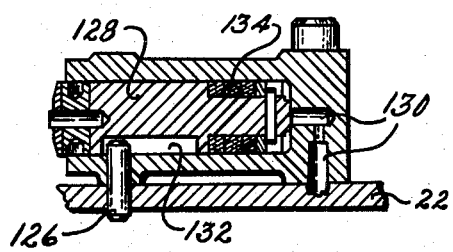
Fig. 3 is a view in section taken along the line 3—3 of Fig. 2.

The pressure piston construction as shown in Fig. 3 is relatively simple. The construction comprises a cylinder block 122 fixed to the end wall 22 by suitable cap screws 124 and pins 126. The block 122 is provided with a bore for receiving a plunger 128. The bore communicates with the intake manifold passage 30 through aligned openings 130 formed in the block 122 and in the end wall 22. The plunger 128 as shown is cut away at 132 to receive the end of the pin 126, referred to above. The cut away portion 130 forms an effective stop for the plunger 128 and prevents its expulsion from the cylinder block 122. The plungers 128 may also be provided as so desired with suitable packing rings 134 which are arranged to prevent loss of high pressure gases which are led into the end of the cylinder block 122 through the openings 130 referred to above. When the pressure of the spring plungers 98 exceeds the gas pressure in the pressure devices 102, the plungers 128 in each of the pressure devices is returned in substantially normal position as shown in Fig. 3 of the drawing.

The essential elements of the present mechanism have thus far been described by disclosing means for coupling a starter turbine to high speed, high power engines, such as gas turbines used for jet propulsion of aircraft, when the starter turbine has attained a certain minimum load operating speed. The planetary mechanism thus far described provides means wherein the application of power to the main gas turbine is not accomplished until the starter turbine has reached a predetermined speed and which will be prevented from attaining an overspeed condition through the provision of means which will effectively slow down and substantially stop the starter gas turbine wheel after a predetermined maximum speed has been reached. Since the speed reducing planetary gearing disclosed herein is connected both to the input and output shafts 28 and 80, respectively, at all times, it is necessary to provide means for rendering the speed reducing coupling ineffective after the main gas turbine has been started and has reached a predetermined minimum speed so that the starter gas turbine wheel 42 will rotate at a speed no greater than the speed of the output shaft 80 connected to the main gas turbine. To this end, centrifugally operated means are provided for locking the planetary web 58 with the planetary gears 54 thereon to the shaft 28 and to the planetary ring 66. As shown most clearly in Fig. 1, the centrifugal control comprises cages 135 mounted within each of the three axially offset portions of the web 58. One portion of the cage 135 bears against an inwardly extending flange formed on the inner wall of the offset portions above referred to. The other portion of the cage 135 comprises a freely slidable member 136 having a cone like central depression formed therein. A heavy metallic ball 138 is arranged to fit in said recess and against the first-named portion of the cage 135 in such a manner that when the planetary web 58 reaches a predetermined minimum speed, centrifugal force will force the ball 138 outwardly thus moving the cage member 136 against the plate 68 in such a manner that the planetary web 58 with the gears thereon is effectively locked to the rotated plates 68 in such a manner that the ring gear 68 and the other portion of the differential mechanism rotate as a unit about the axis of the shaft 28. Since the output shaft 80 is splined to the web 58, and since there can now be no relative rotary motion between the differential elements and the input shaft 28, the speed of the starter turbine wheel 42 will remain equal to the speed of the output shaft 80 thus preventing any damage to the parts of the starter mechanism.

In order to avoid leakage of grease or other lubricants, the transmission section 16 is provided with a cover plate 140 which is secured to the differential housing section 16 by suitable screws 142 and which is provided, as shown in Fig. 1, with suitable seats for bearing 144 for the planetary web 58.

The operation of applicant's above described invention will now be set forth in detail. A propellant is fed from the manifold 32 through the passage 30 and outward to rotate the starter turbine wheel 42. Said wheel 42 turns shaft 28. At the same time the pressure of said propellant is exerted against pistons 88 to lock the ring gear 66 against rotation. This is accomplished by means of the clutch arrangement which comprises rings 82 and 84. The shaft 28 causes rotation of the planetary gears 54 which are splined thereto. Since the ring gear 66 is locked against rotation said planetary gears rotate with the sun gear 58. The latter is splined to the output shaft 80 which is connected to the main gas turbine. Operation of the gears 54 and 58, while the gear 66 is stationary, provides for speed reduction. In order to prevent an over speed condition from occurring the propellant from the manifold 32 is also directed against the reaction buckets 96 on reaction ring 94. These last two members operate in conjunction with the spring plunger 98 and the pressure pistons 102 to maintain the wheel 42 at a fixed maximum speed. At the completion of the starting operation the reaction bucket ring 94 will be in a position to permit exhaust of the propellant to atmosphere. At the same time the pressure acting against pistons 88 will also be released thereby permitting springs 92 to unlock ring gear 66 for rotation. As the speed of the main turbine increases centrifugal force acting on ball 138 will force the member 136 into frictional engagement with extensions on the ring gear 66. Thereafter said gear 66 becomes a part of the planetary gearing system which includes planetary gears 54 and sun gear 58. With the ring gear in operation speed reduction is no longer obtained, and normal operation will proceed.

Although the present invention has been described with particular reference to a starting system for turbine engines particularly adapted for use in jet aeroplanes, it is evident that the invention is not limited thereto but may be used as a starting system for any type of internal combustion engine.

Having thus described my invention what I claim as new and desire to secure by Letters Patent of the United States is:

1. An engine starting system including a starter gas turbine wheel having peripheral buckets thereon, inlet nozzles through which a propellant gas is admitted to said buckets, reaction means against which the propellant gas impinges after passing through said turbine buckets, a pair of members biased in opposite directions to maintain said reaction means in reactive position until the turbine wheel exceeds its predetermined speed, a pair of spring operated members arranged when the turbine wheel exceeds a predetermined speed to move said reaction means out of reactive position, whereby propellant gas is exhausted directly into atmosphere from said turbine buckets, an input shaft, means connecting the turbine wheel to the input shaft, an output shaft, speed converting means connecting said shafts, pressure operated means for causing said speed converting means to act as a planetary speed reducing connection between said input and said output shafts, and centrifugal means arranged to lock said speed converting means to provide a direct driving connection between said output and said input shafts when said output shaft has reached a predetermined speed.

2. An engine starting system including a starter gas turbine wheel having peripheral buckets thereon, inlet nozzles through which a propellant gas is admitted to said turbine buckets, a reaction means against which said propellant gas impinges after passing through said turbine buckets, spring loaded means which urges said reaction means in one direction, pressure actuated means which tend to rotate the reaction means in the opposite direction, the pressure of said spring actuated means being sufficient to maintain said reaction means in reactive position until the turbine wheel attains a predetermined speed, thereby permitting said spring loaded means to move said reaction means out of reactive position to permit the propellant gases to be exhausted into the atmosphere, an input shaft, means connecting the turbine wheel to the input shaft, an output shaft, speed converting means connecting said shafts, pressure operated means for causing said speed converting means to act as a planetary speed reducing connection between said input and output shafts, and centrifugal means arranged to lock said speed converting means to provide a direct driving connection between said output and said input shafts when said output shaft has reached a predetermined speed.

3. An engine starting system including a starter gas turbine wheel having peripheral buckets thereon, inlet nozzles through which a propellant gas is admitted to said turbine buckets, reaction means against which the propellant gas impinges after passing through said turbine buckets, a pair of members biased in a direction to maintain said reaction means in reactive position until the turbine wheel exceeds a predetermined speed, a pair of spring operated members arranged when the turbine wheel exceeds a predetermined speed to move said reaction means out of reactive position, whereby propellant gas is exhausted directly into atmosphere from said turbine buckets, an input shaft, means connecting the turbine wheel to the input shaft, an output shaft, speed reducing gears connecting said shafts, said connecting gears including a sun gear, ring gear and planet gears, pressure-operated means for locking said ring gear against rotation to cause said connecting gears to act as a planetary speed reducing connection between said input and said output shafts, and centrifugal means arranged to lock said connecting gears to provide a direct driving connection between said output and said input shafts after said locking means has been released and when said output shaft has reached a predetermined speed.

4. An engine starting system including a starter gas turbine wheel having peripheral buckets thereon, inlet nozzles through which a propellant gas is admitted to said turbine buckets, a reaction means against which said propellant gas impinges after passing through said turbine buckets, spring loaded means which tend to rotate said reaction means in one direction, pressure actuated means which tend to operate the reaction means in the opposite direction, the pressure of said spring actuated means being sufficient to maintain said reaction means in reactive position until the turbine wheel attains a predetermined speed, thereby permitting said spring loaded means to move said reaction means out of reactive position to permit the propellant gases to be exhausted into the atmosphere, an input shaft, means connecting the turbine wheel to the input shaft, an output shaft, speed reducing gear means connecting said shafts, said gear means comprising a sun gear, ring gear and planet gears, pressure operated means for locking said ring gear to cause said reducing gear means to act as a planetary speed reducing connection between said input and output shafts, and centrifugal means arranged to lock said planet gears to provide a direct driving connection between said output and said input shafts when said ring gear has been released and when said output shaft has reached a predetermined speed.

References Cited in the file of this patent

UNITED STATES PATENTS 2,771,067    Nardone    Nov. 20, 1956

FOREIGN PATENTS 143,577    Australia    Sept. 26, 1951